UNITED STATES PATENT OFFICE.

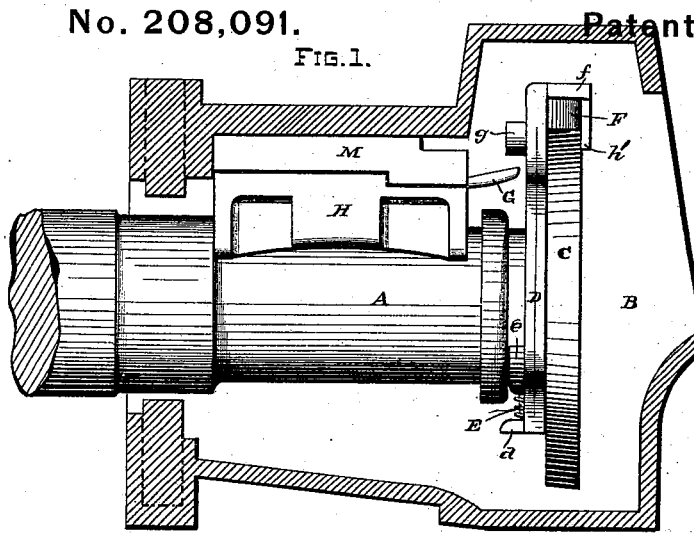

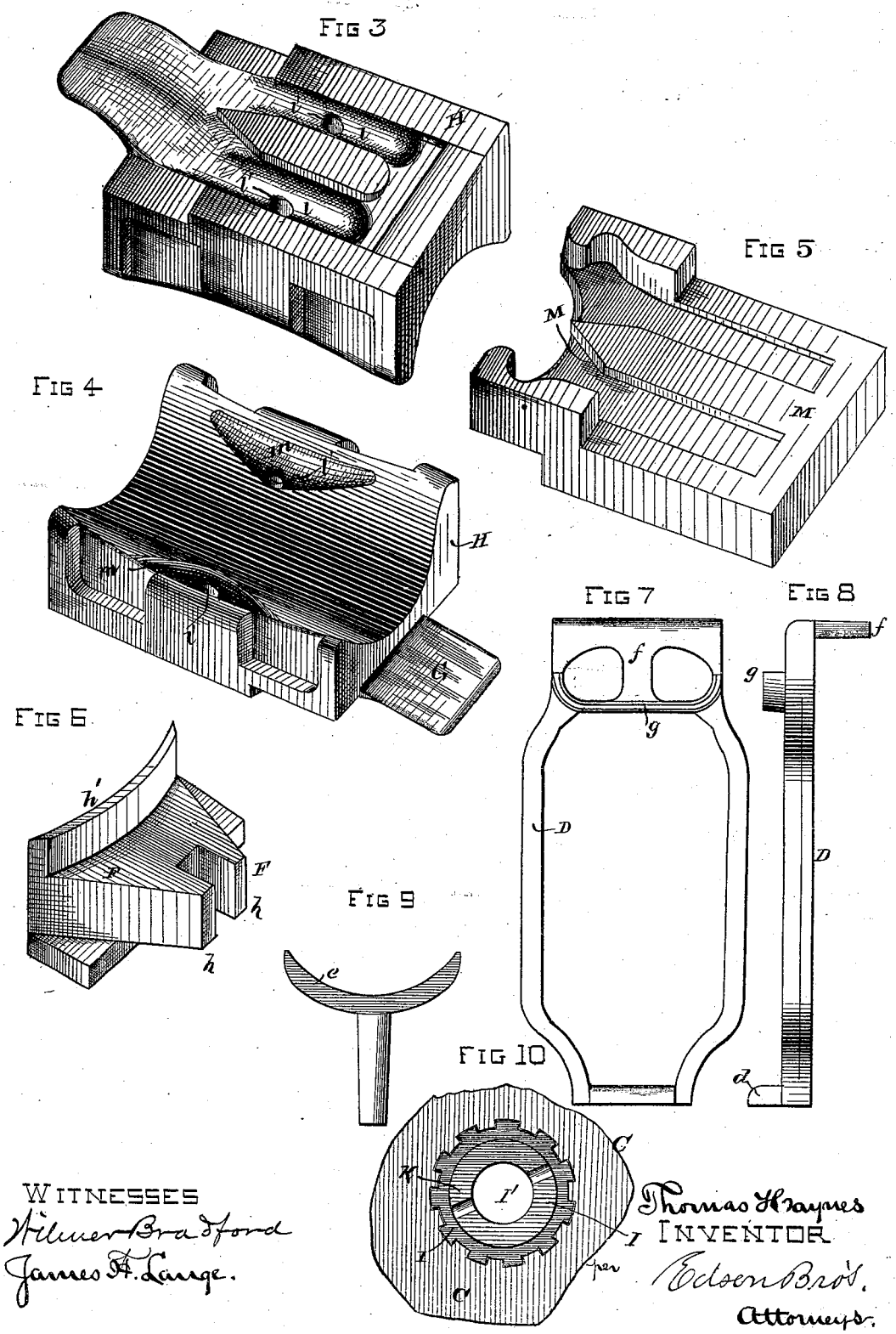

THOMAS HAYNES, OF KANSAS CITY, MISSOURI.

IMPROVEMENT IN CAR-AXLE LUBRICATORS.

Specification forming part of Letters Patent No. 208,091, dated September 17, 1878; application filed July 26, 1878.

*To all whom it may concern:*

Be it known that I, THOMAS HAYNES, of Kansas City, in the county of Jackson and State of Missouri, have invented certain new and useful Improvements in Lubricators; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a vertical longitudinal section, partly in side view, of my improved axle-lubricator. Fig. 2 is a similar view of the same, showing certain details of construction of the lubricant-disk. Fig. 3 is a detached perspective view of the oil or lubricant-feeding brass. Fig. 4 is an inverted perspective view of the brass. Fig. 5 is a similar view of its cap. Fig. 6 is a detached perspective view of part of the lubricant-feeding device used in connection with the yoke. Fig. 7 is a front elevation of a yoke for adjusting the parts in position. Fig. 8 is a side elevation thereof. Fig. 9 is a detailed view of the yoke springholding pin; and Fig. 10 is a toothed disk for use in connection with the lubricant-disk-securing screw or fastening.

The same part in the figures is denoted by the same letter.

This invention relates to certain improvements in lubricators adapted for use in connection with shafts and axles of engines, cars, or other vehicles; and it consists in the construction of the lubricant-feeding device; secondly, in providing the lubricant-feeding brass, which receives the oil or lubricant, with conduits, through which it passes to the lower side of said brass, where it is spread upon the shaft or axle by the scooping or dishing of the brass around the lubricant or oil passages; and, thirdly, in providing the lubricant-disk with a central detachable toothed disk, through which passes a perforated tap-screw, entering the shaft or axle, and receiving a pin passing between flanges on said toothed disk, substantially as hereinafter more particularly set forth.

In the drawings, A refers to an axle or shaft of an engine or car or other vehicle, to which is adjusted the lubricant or oil box B, inclosing the parts of my invention. C is the lubricant-feeding disk, whose perimeter is beveled, as shown—*i. e.*, inwardly—to assist in discharging the lubricant or oil upon the axle A, to which it is attached, as will be fully explained hereinafter.

D is a yoke, fitting on the axle or shaft A, the lower end of which is provided with a perforated inwardly-projecting stud or projection, $d$, which receives a spring-surrounded pin, E, whose upper end is provided with a crescent-shaped head, $e$, fitting against the lower side of the shaft or axle A. This arrangement permits of a limited automatically-yielding movement of the yoke. The upper end of the yoke D is adapted, as at $f$, to overhang the disk C, and provided with a concaved rearwardly-projecting extension, $g$.

F is a conical block, bifurcated at its side, to permit of its arms $h$ passing through the openings in the upper portion of the yoke D, and concaved on its under surface to fit the periphery of the disk C. The oil or lubricant is taken from the disk by the tapering sides of the block F, and is fed to the extension $g$ of the yoke, from which it is passed onto the tongue G of the brass H, to be presently described.

$h'$ is a lip, to prevent the scraper or conical block from moving inwardly. From the rear or inner side of the disk C projects a stud or projection, $i$, fitting into a socket in the end of the shaft or axle A, to hold the same in position in connection with other mechanism, as will be hereinafter described.

I is a toothed disk, fitting centrally within an opening in the disk C, which opening is provided with notches corresponding with the teeth on said disk I. The disk I is provided, itself, with a central opening, I', to receive a screw-bolt, K, inserted into a screw-threaded aperture in the end of the axle or shaft A. Through this bolt is made a transverse aperture or passage, which receives a pin, $j$, a recessed shoulder, $k$, being provided in the central toothed disk I, to also receive the pin $j$, in order to lock the same with the disk C upon the shaft or axle A. To adjust the disk C on the axle or shaft A, the first step is to insert its projection $i$ into the appropriate aperture in the end of the shaft or axle, then insert the tap-bolt K through the central disk and into its aperture in the axle or shaft, and drive the same home. In the event of its aperture not being in line with the recess in the shoulder on the disk I, it will not be necessary to turn the large disk C to attain this result, it only being required to manipulate the small disk I, by which this can be easily brought about and its teeth locked into the notched opening of the larger disk, and the pin $j$ inserted through the bolt K, when the parts will be securely locked in place.

The brass H, which is provided with the tongue G, as aforesaid, is also provided in its upper surface with oil-passages $l\ l$, to conduct the oil or lubricant from the tongue G into and through openings or holes $l'\ l'$ therein, which pass it to the lower concaved side thereof, whence it is spread upon the shaft or axle by dishing or scooping out the brass, as at $m\ m$, around said openings $l'\ l'$. The brass H is fitted with a cap, M, constructed as shown, and adapted to assist in securing, and permit of the ready removal of, the brass.

This application is for improvements on my invention patented November 17, 1874, No. 157,000.

Having thus described my invention, what I claim, and desire to secure by Letters Patent, is—

1. In a lubricator, the disk C, having a central notched opening with or without a projection or stud, $i$, in combination with the axle or shaft A, central toothed disk I, having a recessed shoulder on its face, tap-bolt K, and a pin passing through it, substantially as and for the purpose set forth.

2. The combination of the yoke D, having an extension, $g$, and the scraper or block F, arranged on the inner side of the disk C, with the disk C, substantially as and for the purpose set forth.

3. The combination of the yoke D, having the stud $d$ and extensions $f\ g$, spring-holding device E $e$, bifurcated conical block F $h$, axle A, and disk C, substantially as and for the purpose set forth.

4. The brass H, provided with openings $l\ l$, and dished, as at $m\ m$, on its lower side around the openings $l'\ l'$, substantially as and for the purpose set forth.

5. An axle or shaft lubricator, consisting of the reservoir B, disk C, with a securing disk and bolt, yoke D, having the extensions $f\ g$, bifurcated block F, having lip $h'$, perforated and dished brass H, having tongue G, substantially as and for the purpose set forth.

In testimony that I claim the foregoing as my own I hereunto affix my signature in presence of two witnesses.

THOMAS HAYNES.

Witnesses:
WILMER BRADFORD,
JAMES H. LANGE.